A. C. AND J. L. SAXE.
TIRE MENDER.
APPLICATION FILED JUNE 28, 1918.
1,320,416.
Patented Nov. 4, 1919.
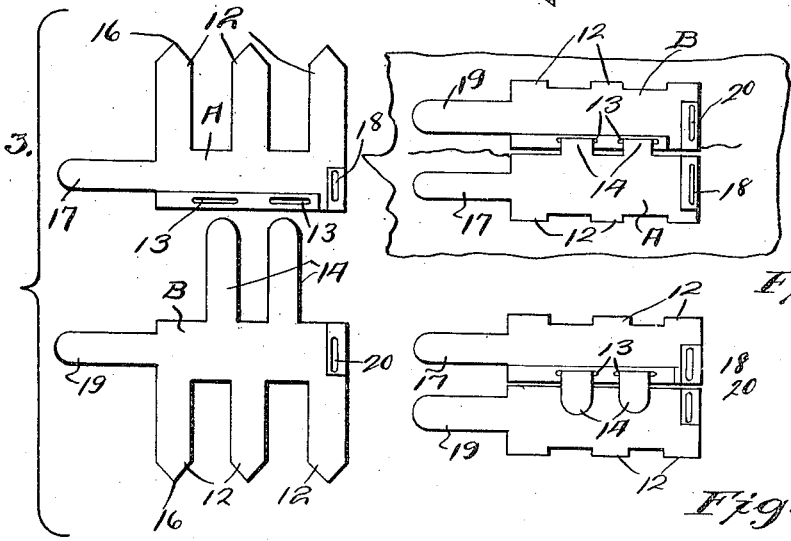

UNITED STATES PATENT OFFICE.

ANDREW C. SAXE, OF WATERBURY, AND JOHN L. SAXE, OF WINSTED, CONNECTICUT.

TIRE-MENDER.

1,320,416.  Specification of Letters Patent.  Patented Nov. 4, 1919.

Application filed June 28, 1918. Serial No. 242,457.

*To all whom it may concern:*

Be it known that we, ANDREW C. SAXE and JOHN L. SAXE, citizens of the United States, residing at Waterbury and Winsted, respectively, in the counties of New Haven and Litchfield, respectively, State of Connecticut, have invented certain new and useful Improvements in Tire-Menders; and we do hereby declare the following to be a full, clear, and exact description of the invention, such as will enable others skilled in the art to which it appertains to make and use the same.

This invention relates to improvements in repairing devices for automobile tires.

One object of the present invention is to provide a novel and simple device whereby a blowout in the outer shoe or casing of the tire can be easily and quickly drawn together and held in such position thus obviating the necessity of vulcanizing a section into the casing.

Another object is to provide a novel and improved device of this character whereby a long slit in the casing can be clamped together and none of the resiliency or pliability of the tire interfered with.

Other objects and advantages will be apparent from the following description when taken in connection with the accompanying drawing.

In the drawing:

Figure 1 is a vertical sectional view taken transversely through a portion of a tire casing showing our invention in applied position, the invention being in elevation.

Fig. 2 is a view showing a portion of the inner surface of a tire casing with two of the mending elements engaged therewith excepting their end tongues.

Fig. 3 is a plan view of two of the sections of the repairing device shown in flat condition.

Fig. 4 is a plan view of two of the parts of the repair device coupled together in the manner in which they are placed in the tire.

Fig. 5 is a plan view of four sections of the device coupled together.

Fig. 6 is a vertical section taken transversely of Fig. 4 in a plane midway between the tongues 14 and looking to the left.

Referring particularly to the accompanying drawing, 10 represents a portion of a tire casing having the rent or tear 11 therein which is to be held together by means of our improved repairing device.

The repairing device includes a pair of metal plates A and B, each of which has formed on one edge thereof a plurality of tongues 12. Adjacent the other edge of the member A there are formed the slots 13. On the same edge of the plate B there are formed the tongues 14 which are adapted to engage in the slots 13 formed on the other edge of the plate A. The tongues 12 are preferably formed with the points 16 to facilitate their penetration into the tire casing, as seen in Fig. 1. At one end of the member A there is formed a tongue 17, while a slot 18 is formed at the other end. In the corresponding end of the member B there is formed a tab or tongue 19, while a slot 20 is formed at the other end.

In the operation of the device the pointed tongues are pushed through the tire casing, as shown in Fig. 1, the ends being bent over. The tongues 14, of the member B are then inserted in the slots 13 of the member A, after the two members have been drawn closely together so as to draw or close the tear in the casing. It will be readily understood that the members A and B are placed longitudinally of the tear and the tongues 12 passed through the casing at opposite sides thereof. After the tongues 14 have been disposed through the slots 13, they are bent downwardly against the member B whereby said members will be held firmly in engagement and the tear completely closed.

Should the tear be longer than the member A or B, additional members C and D, are employed, the former being placed at the slotted end of the member A while the member D is placed at the slotted end of the member B. The members C and D are formed exactly like the members A and B, and the tongues 21 of the member C are engaged through the slots 22 of the member D, while the tongues 23 and 24 of the members C and D are engaged through the slots 18 and 20 of the members A and B, respectively. The tongues of the plates which engage through the slots of the adjacent plates form hinge joints whereby movement is permitted between the plates simultaneously with the flexing of the tire casing.

There is thus provided a simple and cheap device which can be quickly and easily applied to the tire casing without the necessity of special skill, the device being so formed that it will effectively hold the tear in the casing together and thus obviate the need for vulcanizing a section into the casing.

What is claimed is:

1. A tire mending device including a pair of plates each of which is formed with tire penetrating tongues, and means for interlocking engagement between the plates.

2. A tire mending device including a pair of plates disposed on opposite sides of a tear in the tire casing, penetrating tongues on the plates disposed through the tire at opposite sides of the tear, one of the plates being formed with slots, the other plate being formed with tongues for engagement through said slots to hold the plates together and to draw the sides of the tear together.

3. A tire mending device including plates having pointed tongues for penetration in a tire casing at opposite sides of the tear of the casing, said tongues being formed on one of the longer sides of the plate, the opposite side of the plate having slots, the other longer side of the other plate having tongues for engagement in said slots, one of the shorter sides being formed with a slot and the opposite shorter side being formed with a tongue.

In testimony whereof, we affix our signatures, in the presence of two witnesses.

ANDREW C. SAXE.
JOHN L. SAXE.

Witnesses:
E. FRANK MADDEN,
SALVO J. MANGIAFICO.

Copies of this patent may be obtained for five cents each, by addressing the "Commissioner of Patents, Washington, D. C."